(12) United States Patent
Flautt et al.

(10) Patent No.: US 8,313,833 B2
(45) Date of Patent: Nov. 20, 2012

(54) SUPERABSORBENT WATER-RESISTANT COATINGS

(75) Inventors: Martin C. Flautt, Granville, OH (US); James R. Priest, Nashport, OH (US); David V. Stotler, Newark, OH (US); Thomas P. Hager, Westerville, OH (US)

(73) Assignee: Neptco JV, LLC, Pawtucket, RI (US)

( * ) Notice: Subject to any disclaimer, the term of this patent is extended or adjusted under 35 U.S.C. 154(b) by 668 days.

(21) Appl. No.: 12/370,986

(22) Filed: Feb. 13, 2009

(65) Prior Publication Data

US 2009/0258555 A1    Oct. 15, 2009

Related U.S. Application Data

(63) Continuation of application No. 09/409,457, filed on Sep. 30, 1999, now Pat. No. 7,491,778, which is a continuation-in-part of application No. 09/190,866, filed on Nov. 13, 1998, now Pat. No. 6,380,298.

(51) Int. Cl.
*D02G 3/00*      (2006.01)
*B01J 20/26*     (2006.01)

(52) U.S. Cl. .......................... 428/378; 502/402

(58) Field of Classification Search ............. 526/317.1, 526/303.1, 329.7; 525/123; 524/507, 513, 524/522, 556
See application file for complete search history.

(56) References Cited

U.S. PATENT DOCUMENTS

| | | | |
|---|---|---|---|
| 4,214,531 A | 7/1980 | Garrett et al. | |
| 4,222,929 A | 9/1980 | Shanoski et al. | |
| 4,235,764 A | 11/1980 | Dereser et al. | |
| 4,466,151 A | 8/1984 | Barch et al. | |
| 4,526,914 A | 7/1985 | Dolin | |
| 4,609,591 A | 9/1986 | Pollet et al. | |
| 4,618,631 A | 10/1986 | Takeda et al. | |
| 4,659,753 A | 4/1987 | Tiburtius et al. | |
| 4,810,576 A | 3/1989 | Gaa et al. | |
| 4,815,813 A | 3/1989 | Arroyo et al. | |
| 4,888,238 A | 12/1989 | Katz et al. | |
| 4,913,517 A | 4/1990 | Arroyo et al. | |
| 4,942,212 A | 7/1990 | Hanada et al. | |
| 5,071,681 A | 12/1991 | Manning et al. | |
| 5,151,465 A | 9/1992 | Le-Khac | |
| 5,236,982 A * | 8/1993 | Cossement et al. | 524/188 |
| 5,264,251 A | 11/1993 | Geursen et al. | |
| 5,342,686 A | 8/1994 | Guersen et al. | |
| 5,534,304 A | 7/1996 | Geursen et al. | |
| 5,638,569 A | 6/1997 | Newell | |
| 5,689,601 A | 11/1997 | Hager et al. | |
| 5,817,713 A | 10/1998 | Pappas et al. | |
| 6,380,298 B2 | 4/2002 | Flautt et al. | |

FOREIGN PATENT DOCUMENTS

| | | |
|---|---|---|
| AU | 765727 B2 | 9/2003 |
| CA | 2350237 A1 | 5/2000 |
| CA | 2385166 A1 | 4/2001 |
| EP | 482703 | 4/1992 |
| EP | 482703 A1 | 4/1992 |
| EP | 760834 | 6/1994 |
| EP | 1137714 B1 | 10/2001 |
| JP | 62053309 A | 3/1987 |
| JP | 04284236 | 10/1992 |
| JP | 06289262 | 10/1994 |
| JP | 7-45132 | 2/1995 |
| JP | 7045132 | 2/1995 |
| WO | 9115434 A1 | 10/1991 |
| WO | 93/18223 | 9/1993 |
| WO | 96/23024 | 8/1996 |
| WO | 96/37900 | 11/1996 |
| WO | 96/40849 | 12/1996 |
| WO | 99/10591 | 3/1999 |
| WO | WO 99/10591 | 3/1999 |
| WO | 00/29486 | 5/2000 |
| WO | WO-0123479 A1 | 4/2001 |

* cited by examiner

*Primary Examiner* — Hui Chin
(74) *Attorney, Agent, or Firm* — Mintz, Levin, Cohn, Ferris & Glovsky & Popeo, P.C.

(57) ABSTRACT

Articles coated with a water-resistant coating that absorbs water to provide the water-resistant effect, and desorbs water when the coating is dried, and a method of providing water resistance and corrosion resistance to articles prepared with such coatings. The coating is formed by applying a composition comprising an aqueous solution of a superabsorbent water-soluble polymer precursor, optionally a viscosity modifying agent, and optionally a lubricant onto the surfaces of the article, and curing to form a coating comprising the superabsorbent polymer.

17 Claims, No Drawings

SUPERABSORBENT WATER-RESISTANT COATINGS

This application is filed as a continuation application of application Ser. No. 09/409,457, filed Sep. 30, 1999 and issued as U.S. Pat. No. 7,491,778, which is a continuation-in-part of application Ser. No. 09/190,866, filed Nov. 13, 1998, which issued as U.S. Pat. No. 6,380,298.

TECHNICAL FIELD AND INDUSTRIAL APPLICABILITY OF THE INVENTION

The present invention relates to a high strength superabsorbent coating capable of rapidly absorbing water, which is suitable for coating a variety of articles requiring a water-resistant surface, including, but not limited to, reinforced or molded products, as well as reinforcing materials used in the manufacture of such products. More specifically, the coating is formed from a composition comprising a superabsorbent polymer precursor that, upon curing, forms a polymer with a high water swelling ability; and a film-forming polymer. The coating composition may further include a viscosity-modifying agent.

The inventive concept also relates to articles coated with the superabsorbent coating composition, including reinforced and molded products and fibrous reinforcing materials; as well as methods of applying such coatings. The coating of this invention demonstrates a high level of water absorption in fresh and salt-water environments, and excellent spreading and coating ability when applied to a substrate.

BACKGROUND OF THE INVENTION

Deterioration caused by the invasion of moisture beneath the exposed surfaces of articles used in outdoor environments is a well-known problem. This deterioration includes oxidative deterioration caused by reaction of water with the surfaces of reinforcing fibers used in these articles, as well as water-induced corrosion. In marine environments, for example, the problems associated with waterlogging are particularly compounded by the salinity of the environment. The presence of salt in such aqueous environments hastens the oxidative decomposition. In non-saline environments, for example in environments having high atmospheric humidity, water-resistant coatings are necessary to protect the structures and equipment surfaces from moisture-induced decomposition.

Articles affected by the deterioration described above include items having a surface exposed to high moisture or humidity. Examples of such articles include reinforced rods and cables, such as fiber optic or telecommunications cables. These telecommunications cables are often used in situations where they are buried underground or submerged in water over long periods. As such, protection from water damage is critical to the structural integrity of these cables and to the success of the functions they are intended to perform. A telecommunications cable, for example, may include a core comprising a glass rod that acts as a stiffening or reinforcing member. This rod contributes to the rigidity of the cable. When water penetrates to contact the core element of the cable, corrosion or chemical deterioration of the cable infrastructure may result.

In order to combat the problems associated with this waterlogging damage, several strategies have been devised in an attempt to provide water resistance to cables and other reinforced articles, and to protect their sensitive inner surfaces from contact with water or water vapor present in the surrounding environment. These techniques for making water-repellent articles have included wrapping the articles in a protective sheathing material; or sealing the surface to be protected. Sealing techniques may include chemically manipulating the surface layer of the article to render it resistant to water-absorption, or applying a repellent coating.

The technique of covering the surface with a protective sheathing material is conventional. It includes for example, using a wrap or tape made of an impervious polymer with water-blocking ability, or treating the wrapping material with an emulsion or solution of a water-blocking polymer. The sheathing process does not require application of a chemical compound or treatment to the surface of the article, rather the protection is derived only from the coverage by the sheathing material.

Coatings used to repel water traditionally have been composed of substances that are both insoluble and impenetrable to water, and therefore presented a physical barrier to encroaching moisture. Such barrier coatings have included materials such as greases or gels. In the case of cables, for example, these coatings are applied by extrusion under pressure. There are however, certain drawbacks associated with this type of coating. Greases or gels are difficult to handle because of their slipperiness, and they contribute an unpleasant feel to the coated article. This is an important factor to be considered in the manufacturing process, particularly because it affects the ease of handling of the cable during splicing operations. Greases and gels also undergo changes in viscosity at low or high temperatures. These viscosity changes may affect the freeze/thaw performance and therefore the stability of the coating. Poor performance in these respects therefore affects the stable performance of the cables.

More recently, greaseless, water-resistant dry coatings have been devised which, of themselves, have some degree of water-absorbing capacity. This ability to absorb water allows the coating to absorb the moisture contacting the article, while preventing direct contact with the sensitive surfaces. The absorbent component in these dry waterblocking coatings is a dry, granulated superabsorbent polymer that swells and absorbs upon contact with water. The superabsorbent polymers are usually characterized in terms of their swell rate, swell capacity and gel strength. Traditional uses for these dry superabsorbent polymers have primarily included personal hygiene product articles, food packaging articles and chemical spill cleanup compositions, however recent experimentation has included using these dry polymers to form coatings for other articles such as reinforced cables. For example, U.S. Pat. No. 5,689,601 to Hager, which is herein incorporated by reference, discloses a dry waterblocking coating for reinforcing fiber articles using a powdered or granulated water-soluble dry blocking ingredient encased in one or more thin layers of a sheathing polymer. This casing restricts the degree of water absorption that can be achieved by the granular polymer, and accordingly the swell capacity of this coating is limited.

The superabsorbent polymers traditionally used in dry waterblocking cable coating applications are dry, water-insoluble, granular polymers that are incorporated into various substrates such as yarn, binders and tape. The substrates typically also contain glass fibers as a form of reinforcement. However, as discussed above, the coatings formed with dry granulated blocking agents suffer the limitations of limited water swelling ability and swell rate as a necessary consequence of optimizing the gel strength. In the context of surface coatings, gel strength is defined as the ability to prevent water from wicking down the cable axis, particularly when the cables are used in aqueous environments where they are exposed to elevated water pressures. The swelling ability is directly related to the degree of cross-linking of the superabsorbent polymer. As the degree of cross-linking increases, so does the gel strength, but there is a related decrease in the swell rate and swell capacity of the polymer. The swell rate defines the amount of water that the coating absorbs over a fixed period of time. The swell capacity denotes the maximum amount of water or fluid absorbed by the coating, based on a measure of its dry weight. Consequently, coatings made of dry, granular, water-insoluble polymer are limited in their water-absorbing performance, as measured in terms of the swell rate and swell capacity.

Generally, coatings for reinforced fibers, strands and articles such as cables that are made from these fibrous materials are applied to the surface of the fibrous material and then cured before further processing, if any, occurs. The means of applying coatings, in general, differs depending on whether a fluid coating is used or whether a solid particulate coating is being applied. In the case of powdered coatings, the coating process using granulated water-blocking agents involves several time-consuming and labor- and equipment-intensive steps that are directly related to the use of a granulated polymer. These steps include the need for one or more treatments with a binding resin, and one or more applications of powdered resin at the powder-coating stations using apparatus such as a fluidized bed.

The means for applying fluid coatings may include flooding, or dipping the fibers or cables, for example, in a resin bath and then removing excess resin to form a consistent layer on the treated surface. In the case of strands, rovings or cables, the product is in the form of a continuous filament and therefore it can be passed through a stripper die to remove the excess resin. Alternatively, the coating may be sprayed onto the surface of the article. In order to form a coating layer that is thick enough to provide good coverage and protection from water penetration, the coating composition must be thick enough that it can adequately coat the article in one pass through the coating apparatus. In addition to thickness however, the composition must also have sufficient flowing ability to allow ready formation of a uniform coating on the surface of the article, and to prevent clogging of the coating apparatus, dye orifices or other machinery used to make polymer-coated fibrous articles. Traditionally in the art, in order to modify the viscosity of the fluid coating composition, dry particulate ingredients such as a flocculent polymer or starch have been used. The difficulty with such compositions is that the resulting composition after this solid ingredient is added is not homogenous. Rather, the composition contains varying levels of a particulate material, which makes handling difficult and also compromises the spreadability of the composition.

There exists in the art then, a need for a waterblocking coating composition for application to reinforced articles or reinforcing materials, which possesses excellent gel strength and wicking ability, as well as a high degree of water absorption and a concurrent, rapid swell rate. At the same time, a further need exists in the art for a coating composition that does not contain powdered polymer, and which, as a result, would not require a costly and labor intensive application process. Moreover, it is desired that such a coating composition exhibit good spreading and surface performance characteristics.

SUMMARY OF THE INVENTION

It has now surprisingly been discovered that highly absorbent waterblocking coatings having an excellent water swelling capacity and a rapid swell rate can be formed by incorporating a solution of a superabsorbent polymer precursor into an aqueous solution used to coat fibrous reinforcing materials and articles comprising one or more reinforcing fiber materials. The polymer precursor, when cured, forms a superabsorbent polymer. The coatings containing this superabsorbent polymer are capable of substantially instantaneous water absorption when exposed to aqueous environments.

Depending on the intended application, the superabsorbent coating may be enhanced by adding a viscosity-modifying agent. For example, where the coating composition is applied to rods or cables comprising glass, carbon, polymer or mixtures thereof, including a viscosifier imparts excellent spreading ability to the formulation. Where the article being coated is a more pliable product which allows dipping or spraying as a means of application, the viscosity of the coating formulation may be reduced to allow application by these or similar means.

In another aspect, this invention also relates to a process of forming a coating onto the surface of an article such as a fiber-reinforced molded product, or onto the surfaces of a fibrous reinforcing material. Generally, this process includes the steps of applying the coating composition to the surface of the fibers, strands or articles, passing it through a stripper die to remove excess coating, followed by a drying or curing step.

The inventive concept further relates to articles containing reinforcing fibers that are treated using the water-absorbent coatings.

DETAILED DESCRIPTION OF THE PREFERRED EMBODIMENTS OF THE INVENTION

The composition of this invention is suitable for forming a superabsorbent coating on the surface of articles or materials requiring surfaces that are resistant to water, and therefore protects the material underlying the surfaces that are treated with the coating.

The term "article", as it is used herein, is specifically intended to include any product or material having a surface that requires a water-resistant coating to protect the underlying structure from deterioration caused by exposure to moisture. Such articles include molded articles including fiber reinforced composite articles, laminates, sheets, reinforcing fiber materials known in the art, and products made using one or more of these fiber materials, either collectively or dispersed within a matrix of any type. The term also includes articles manufactured using reinforced fiber products, such as structural materials or in equipment.

The articles that may be coated with the compositions of the present invention may include fibrous reinforcing materials such as glass, polymer, carbon, natural fibers, or blends thereof. Preferably, the polymer fibers comprise one or more fibers selected from the group consisting of aramid fibers, nylon fibers, kevlar fibers, polyester fibers, polyethylene fibers, polypropylene fibers and combinations thereof. These fibrous materials may be used in the form of fibers, strands or rovings, either in continuous form or as chopped fibers, strands, or pellets; tapes, mats and fabrics comprised of glass, polymer or natural fibers; composites such as pultruded rods or cables, laminates and other molded articles. Also, the coating can be applied to the surfaces of articles requiring a surface that is resistant to water penetration, such as corrugated metallic tubes and tapes used for rodent protection in fiber optic cables. Moreover, the superabsorbent coating may be applied to the surfaces of article that do not contain conventional reinforcing materials, but which would nonetheless benefit from the excellent water-absorbing protective properties of the coating. For example, molded articles, woven fabrics, scrims, wood and paper products, and construction materials such as steel beams are among the many articles that may be protectively enhanced by application of the present invention.

In one embodiment, the articles for coating according to the invention include articles that comprise a reinforcing fiber material as at least one component thereof. Examples include articles formed in a pultrusion operation. For example, the coatings of this invention can be successfully applied to a pultruded rod or cable comprised at least partially of reinforcing glass fiber/polymer composite. The polymers that may be used to form these pultruded articles include thermosetting resins, such as epoxies, polyesters and vinyl esters. The polymer component of the pultruded article may also be a thermoplastic resin that has been heat-treated, however a thermosetting resin is preferred. As an example, a thermosetting epoxy resin such as a vinyl ester may be combined with glass strands in a pultrusion operation to form a rod that can be used as the stiffening member in a telecommunications cable.

As another embodiment, examples of fibrous reinforcement products in the first category mentioned above include strands or rovings made from fiber-forming materials such as glass, carbon, polymers or mixtures thereof. The coating formulation for these products will preferably include a small amount of a lubricant.

The water resistant properties of the coatings of the present invention are obtained by combining a solution of a non-toxic, environmentally safe superabsorbent polymer precursor with the binder resin used to coat the substrate articles. The superabsorbent polymer formed by this precursor possesses a surprisingly high capacity for absorbing water, and at the same time maintains a high gel strength in the cured coating as a result of increased cross-linking. As mentioned previously, this polymer uniquely provides water resistance by absorbing large quantities of water. As water contacts the coated surface of the article to be protected, the coating absorbs water and swells in volume. By absorbing the water, the coating effectively wicks away the moisture and thus prevents it from contacting the inner surfaces of the protected article. As a result, the sensitive inner surfaces remain dry and are protected from waterlogging deterioration. The coatings of this invention uniquely achieve water resistance protection by absorbing water to prevent moisture penetration beneath the coating layer. This function is distinctly different from the type of protection accomplished by the barrier coatings more commonly known in the art, which protect the substrate by forming an impermeable barrier.

The non-toxic, environmentally safe superabsorbent polymer precursor used in the coatings of this invention may be selected from any such polymer capable of forming an aqueous solution for use in the coating mixture, and which, upon cure, has a swell capacity and swell rate that enables rapid absorption of large amounts of water followed by desorption without loss of the polymer itself when the coating is dried. A polymer precursor suitable for use in the present coating will demonstrate a swell capacity of up to about 400 times its initial dry weight when the coating is applied to reinforcing fibers or strands and cured.

The superabsorbent polymer precursor for use in the present invention may, for example, be selected from the group of water-soluble polyacrylates possessing the required ability to absorb and desorb large quantities of water, as has been previously mentioned. The superabsorbent polymer precursor is preferably used in its anionic form as a salt of a corresponding alkali or alkali metal salt. The polymer salt is in the form of an aqueous solution that is either clear or slightly cloudy in appearance. A desirable solids content is in the range of from 30-35% weight. The solution also has a specific gravity of about 1.1 grams per milliliter and a viscosity of about 1000 mPas at about 20° C. The solution is typically slightly anionic, having a pH of from about 6 to about 8. One example of an acceptable superabsorbent polymer precursor is a water-soluble anionic polyacrylate in aqueous solution. It is conceivable that coatings comprising the high swelling superabsorbent polymer of the present invention would absorb significantly higher quantities of water, demonstrating swell rates up to and including 600 times the dry weight.

A viscosity-modifying agent may also be added to the coating composition. The role of this viscosifier is to create a spreading consistency that will enable adequate coating of the article. For example, in the coating of pultruded articles, the coated article is often passed through a stripper die. Therefore, the viscosity should be sufficient to provide good flowing ability and to prevent clogging of the coating apparatus and die orifices. The viscosity-modifying agent is not an insoluble powdered component, rather it is a polymeric solution or dispersion that can be easily incorporated into the coating composition. Hence, unlike waterblocking coatings previously known in the art, the coating composition of this invention is in the form of a true solution having substantially no particulate components. Viscosity modifying agents capable of forming a true solution, such as alkyl cellulose or acrylamide polymers, may be used in the coatings of this invention. A preferred viscosifier for use in the present coatings is a polyacrylamide in aqueous solution. The polyacrylamide solution is particularly suitable because of its compatibility with the superabsorbent polymer precursor solution and the film-forming binder component.

The binder component used in the coating compositions of this invention can include any polymeric material customarily used as a binder in coating compositions for reinforced fiber-containing products. The binder preferably comprises a film-forming polymer or polymer latex that is a thermosetting resin or a thermosetting resin with some thermoplastic properties to enhance the flexibility of the coating. The film-forming binder is also necessarily compatible with the water-absorbing polymer and with the viscosity-modifying agent, in that it promotes combination of the ingredients in the coating composition, and also facilitates adherence of the coating to the surface once it is applied. The film-former further provides a tough film with preferably no surface tackiness or flaking of the coating after it is cured. The film-forming polymer comprised in the binder may for example be a polyester, urethane, epoxy, latex or mixtures thereof. The latex may in turn be selected from an acrylic latex, a styrene-butadiene latex, or mixtures thereof. Preferably, the binder is a film-forming urethane that promotes adherence of the water-absorbing polymer to the treated surface after it is dried. An example of a desirable film-forming binder is Witcobond® W320, which is a polyurethane film-former available from Witco Chemical Co.

Optionally, the coating composition may also include one or more additives selected from the group consisting of lubricants and wetting agents. Lubricants are added to enhance the handling of the polymer-impregnated strand in subsequent processing. Where the coating is applied to fiber reinforcements such as glass strands, a lubricant is preferably added to reduce stiffness of the strand which enhances the rate of water absorption.

The wetting agent is added to facilitate contact between the dispersion and the fiber surface. Any conventional wetting agent that is compatible with the other ingredients of the sizing composition can be used.

When the coatings of the invention are applied to the surfaces of reinforcing fiber strands and cured, they demonstrate a swell capacity of from about up to about 400 times the initial dry weight of the water-swellable polymer. Preferably, the swell capacity for this type of application is from about 200 to about 400 times the initial dry weight of the water-swellable polymer. Where the coatings are applied and cured on the surface of articles such as rods or cables, the swell capacity ranges up to 120 times the initial dry weight of the water-swellable polymer. In this context, preferably the swell capacity is from about 50 to about 100 times the initial dry weight of the water-swellable polymer.

The swell rate of the coating should also be high. The coatings of this invention demonstrate an exceptionally high swell rate, in the order of from about 50 grams water to about 340 grams (about 300% to about 2000%) weight in the first minute, based on the total weight of the polymer and the fiber substrate, where deionized water is used for example, to simulate a fresh-water environment. The swell rate may vary slightly from this range depending on the presence of ionic species or other additives in various fresh water environments. However, generally, in fresh water, the swell rate is higher than can be achieved in a saline solution such as a marine environment. In a saline environment, for example, the rate of water uptake varies depending on the salinity of the aqueous environment in which the coating is used. Typically, the coatings of the invention demonstrate an absorbency of between about 33 grams salt water per gram and about 66 grams salt water per gram (about 300% to about 760%), in the first minute. However, whether the coating is used in either a fresh or salt-water environment, its performance, as measured by the swell rate, is demonstrably higher than has been previously achieved by dry waterblocking coatings known in the art. In a preferred embodiment, the water resistant coating of the invention has the ability to absorb either about 126 grams of deionized water per gram of dry coating, or about 50 grams of salt water per gram of dry coating, in the first minute of exposure.

In the method of making the coating compositions of this invention, the ingredients are combined in liquid form to prepare the coating solution. A solution of the superabsorbent polymer precursor is first stirred to ensure homogeneity, then added to a mixing tank. Deionized water is then added to the tank, and the lubricant, if desired, is then introduced. Next, the polyurethane in the form of an aqueous emulsion is pumped into the tank. The viscosity-modifying agent is first premixed to form a 1% wt. aqueous solution, and a sufficient amount of this aqueous solution is added to the mixing tank. As a final step, the mixture is then stirred, without heating, and the resulting composition is ready for application.

The composition is contacted with the surface of the articles to be coated by a means suitable for applying a liquid coating. For example, the coating composition can be applied by passing reinforcing fiber strands through a resin bath. Alternatively, the composition is applied to an article to be coated by spraying, flooding, or by any other means which permits the liquid coating to be contacted with the entire surface of the article. A further processing means may then be used to ensure an even and adequate distribution of the coating layer. For example, fiber strands or rods coated with the coating composition are passed through a stripper die.

The coated articles are then dried and cured. The article coated with the superabsorbent polymer precursor can be heated to 212° F. (100° C.) for a period sufficient to volatilize a substantial portion of the water. The polymer precursor-coated article is then heated to approximately 280° F. (138° C.) to cure the polymer by cross-linking. Typically, polymers heated to above approximately 300° F. (149° C.) lose the desired superabsorbent quality. The drying/curing step may be performed in an in-line oven. In a 38 foot (11.58 meters) long oven set to approximately 600° F. (316° C.) the polymer is cured at 380-490 feet (115-149 meters) per minute, and preferably at 440-465 feet (134-142 meters) per minute.

Glass fiber reinforced articles having the water resistant coating herein described may be used in applications where exposure to water or water vapor is likely, and where the formation of a durable, resilient, flexible coating with good waterproofing properties is desired. The following examples are representative, but are in no way limiting as to the scope of this invention.

EXAMPLES

Exemplary coating formulations were prepared by combining a film-forming binder polymer, a water-absorbing polymer precursor solution and a polyacrylamide solution. The coating compositions were then applied to pultruded glass-vinyl ester rods using a flooding process. After the coating composition was applied, the rod was passed through a stripper of desired orifice size to control the amount of coating composition deposited on the surface of the rod. The rod was then heated to volatilize the water component, then further heated to about 270° F. (132° C.) to cure the coating and activate the superabsorbent polymer precursor.

Example 1

In this example, a coating composition for treating pultruded glass/polymer rods was formulated by mixing the ingredients in the proportions listed below:

33.3% weight of a superabsorbent polyacrylate precursor solution (aqueous), available commercially as Stockhausen Cabloc FL from Stockhausen Inc. or Product XP-99.01 from Emerging Technologies Inc. (ETI);

25.0% weight of a urethane film-forming polymer, Witcobond® W290H, available from Witco Chemical Co.; and 41.7% weight of a 1% wt. aqueous acrylamide solution, Drewfloc 270, which is available commercially from Ashland Chemical Inc.

Example 2

In this coating composition for pultruded rods, the ingredients were combined as follows:

28.6% weight Stockhausen 63815 superabsorbent polyacrylate precursor solution;

35.7% weight urethane film-forming polymer, Witcobond® W320, available from Witco Chemical Co.; and 35.7% weight of a 1% wt. aqueous solution of Drewfloc 270.

Example 3

Water Resistance Testing

An exemplary coating composition was developed according to the following formulation:

40.0% weight Stockhausen 63815 superabsorbent polyacrylate precursor solution;

7.5% weight Witcobond® W320 polyurethane film-forming polymer;

2.0% weight Emerlube 7440, a sulfonated mineral oil available from Henkel Corp.;

2.0% weight of a 1% wt. aqueous solution of Drewfloc 270; and 48.5% weight of deionized water.

The composition was applied to glass fiber reinforcement strands designed for use in optical cables. The reinforcements were then immersed in either deionized water or in a 1% wt. saline solution. The swell rate in both the fresh water and the marine environments were determined by measuring the percentage swell or increase in weight over time intervals ranging from 0-20 minutes. As a comparison, strands coated with a dry waterblocking coating using granulated polymer powder were also immersed in both the fresh and salt-water environments for the same period of time.

The strands coated according to this invention and immersed in deionized or fresh water showed a swell rate that was up to seven times faster than the swell rate for the rods coated with the dry, granulated polymer, within the first minute of exposure. The swell capacity or the overall amount of swell was up to 270% higher in comparison to the dry coating. In the salt-water environment, the coating of this invention demonstrated a swell rate that was more than 6 times faster than the dry granulated coating within the first minute of exposure. The coating also showed up to 50% more swell capacity than the dry coating.

These results clearly show that the coating solutions of the present invention achieve superior water absorption, and correspondingly, superior water resistance, when they are applied to articles that are exposed over prolonged periods to an aqueous fresh- or salt-water environment.

Examples 4-5

The coatings of the present invention were further investigated to determine their efficacy when applied to reinforcing fiber materials such as strands or rovings. Strands of glass reinforcing fibers were coated with the coating and the percentage swell over time, calculated based on the total weight of coating and fiber was measured. In comparison, strands coated with the dry, granular coatings were also tested to determine the swell rate of the coating. In Example 4, the reinforcements were immersed in deionized water. For Example 5, the reinforcements were exposed to a 1% wt. sodium chloride solution. The results obtained are included in Table 1 and 2 below:

TABLE 1

Example 4 - Water Absorption in Deionized Water

| | Swell Rate$^a$ (% swell/time) | |
|---|---|---|
| Time (minutes) | Example 4 | Comparison Sample |
| 0 | 0 | 0 |
| 0.033 | 612 | 86 |
| 0.0833 | 677 | 119 |
| 0.1666 | 730 | 168 |
| 0.25 | nr$^1$ | 210 |
| 0.333333 | 745 | nr |
| 0.5 | 751 | 264 |
| 0.666666 | 754 | nr |
| 0.83333 | 758 | nr |
| 1 | 762 | 336 |
| 1.5 | 770 | nr |
| 2 | 778 | nr |
| 5 | 810 | 480 |

TABLE 1-continued

Example 4 - Water Absorption in Deionized Water

| | Swell Rate$^a$ (% swell/time) | |
|---|---|---|
| Time (minutes) | Example 4 | Comparison Sample |
| 10 | 865 | 575 |
| 20 | 975 | 650 |

$^1$nr = not recorded
$^a$Swell rate was measured as the percentage change in weight of the coated strand per unit time.

TABLE 2

Example 5 - Water Absorption in 1% wt. Sodium Chloride Solution (approximates marine salt water environment)

| | Swell Rate$^a$ (% swell/time) | |
|---|---|---|
| Time (minutes) | Example 5 | Comparison Sample |
| 0 | 0 | 0 |
| 0.030 | 225 | 38 |
| 0.0833 | 237 | 47 |
| 0.25 | 265 | 81 |
| 0.5 | 276 | 88 |
| 1 | 295 | 99 |
| 2 | 312 | 118 |
| 5 | 325 | 140 |
| 10 | 350 | 142 |
| 20 | 415 | 158 |

It is believed that Applicants' invention includes many other embodiments which are not herein specifically described, accordingly this disclosure should not be read as being limited to the foregoing examples or preferred embodiments.

We claim:

1. An article at least partially coated comprising at least one surface of the article at least partially coated with a superabsorbent polyacrylate polymer coating comprising:
   at least one water-soluble superabsorbent polyacrylate polymer precursor in aqueous solution, which cures, when the coating is applied to the at least one surface, to form a superabsorbent polyacrylate polymer; and
   a film forming binder in aqueous solution compatible with the superabsorbent polyacrylate polymer, the film forming binder is selected from the group consisting of polyesters, epoxies, acrylic latex, a styrene-butadiene latex, and mixtures therefore,
   wherein the superabsorbent polyacrylate polymer, when cured, absorbs from about 50 to about 400 times its initial dry weight of water when immersed in an aqueous environment.

2. The article according to claim 1 wherein the article is selected from the group consisting of tapes, mats, fabrics, rovings, fibrous strands, laminates, sheets, rods and cables.

3. The article according to claim 1 wherein the article is selected from the group consisting of molded articles, woven fabrics, scrims, wood and paper products, and construction materials.

4. The article according to claim 1 wherein the article comprises a fibrous reinforcing material.

5. The article according to claim 4 wherein the fibrous reinforcing material is selected from the group of reinforcing fibers consisting of glass fibers, polymer fibers, carbon fibers, natural fibers, and blends thereof.

6. The article according to claim 5 wherein the reinforcing fibers comprise polymer fibers selected from the group consisting of aramid fibers, nylon fibers, poly(imino-1,4-phenyleneiminocarbonyl-1,4-phenylenecarbonyl) fibers, polyester fibers, polyethylene fibers, polypropylene fibers, and combinations thereof.

7. The article according to claim 6 wherein the polymer fibers comprise aramid fibers.

8. The article according to claim 1 wherein the superabsorbent polyacrylate polymer coating is corrosion resistant.

9. The article according to claim 1 wherein the superabsorbent polyacrylate polymer coating has a swell rate of from about 50 grams of deionized water per gram of dry coating to about 340 grams of deionized water per gram of dry coating in about the first minute.

10. The article according to claim 1 wherein the superabsorbent polyacrylate polymer coating has a swell rate of from about 33 grams of salt water per gram of dry coating to about 66 grams of salt water per gram of dry coating in about the first minute.

11. The article according to claim 1 wherein the superabsorbent polyacrylate polymer coating has a swell rate of about 126 grams of water per gram of dry coating and about 50 grams of salt water per gram of dry coating in about the first minute.

12. The article according to claim 1 wherein the superabsorbent polyacrylate polymer coating further comprising a wetting agent.

13. The article according to claim 1 wherein the water-soluble superabsorbent polyacrylate polymer precursor is selected from the group consisting of alkali salts and alkali metal salts of a poly(acrylic acid).

14. The article according to claim 1 wherein the superabsorbent polymer coating covers an entire surface of the article.

15. An article at least partially coated comprising at least one surface of the article at least partially coated with a superabsorbent polyacrylate polymer coating comprising:
   at least one water-soluble superabsorbent polyacrylate polymer precursor in aqueous solution, which cures, when the coating is applied to the at least one surface, to form a superabsorbent polyacrylate polymer;
   a lubricant; and
   a film forming binder in aqueous solution compatible with the water-absorbing polyacrylate polymer, the film forming binder is selected from the group consisting of polyesters, epoxies, acrylic latex, a styrene-butadiene latex, and mixtures therefore,
   wherein the superabsorbent polyacrylate polymer, when cured, absorbs from about 50 to about 400 times its initial dry weight of water when immersed in an aqueous environment.

16. An article at least partially coated with an aqueous coating composition comprising:
   a water-soluble superabsorbent polymer precursor selected from the group consisting of alkali salts and alkali metal salts of a water-soluble polymer; and
   a film-forming binder, wherein said film forming binder is selected from the group consisting of polyesters, epoxies, acrylic latex, a styrene-butadiene latex, and mixtures therefore,
   wherein the superabsorbent polymer, when cured, absorbs from about 50 to about 400 times its initial dry weight of water when immersed in an aqueous environment.

17. The article of claim 16 wherein the water-soluble polymer is a poly(acrylic acid).

* * * * *